H. W. ALDEN
AXLE.
APPLICATION FILED MAR. 31, 1910.
1,108,114.
Patented Aug. 25, 1914.
2 SHEETS—SHEET 1.
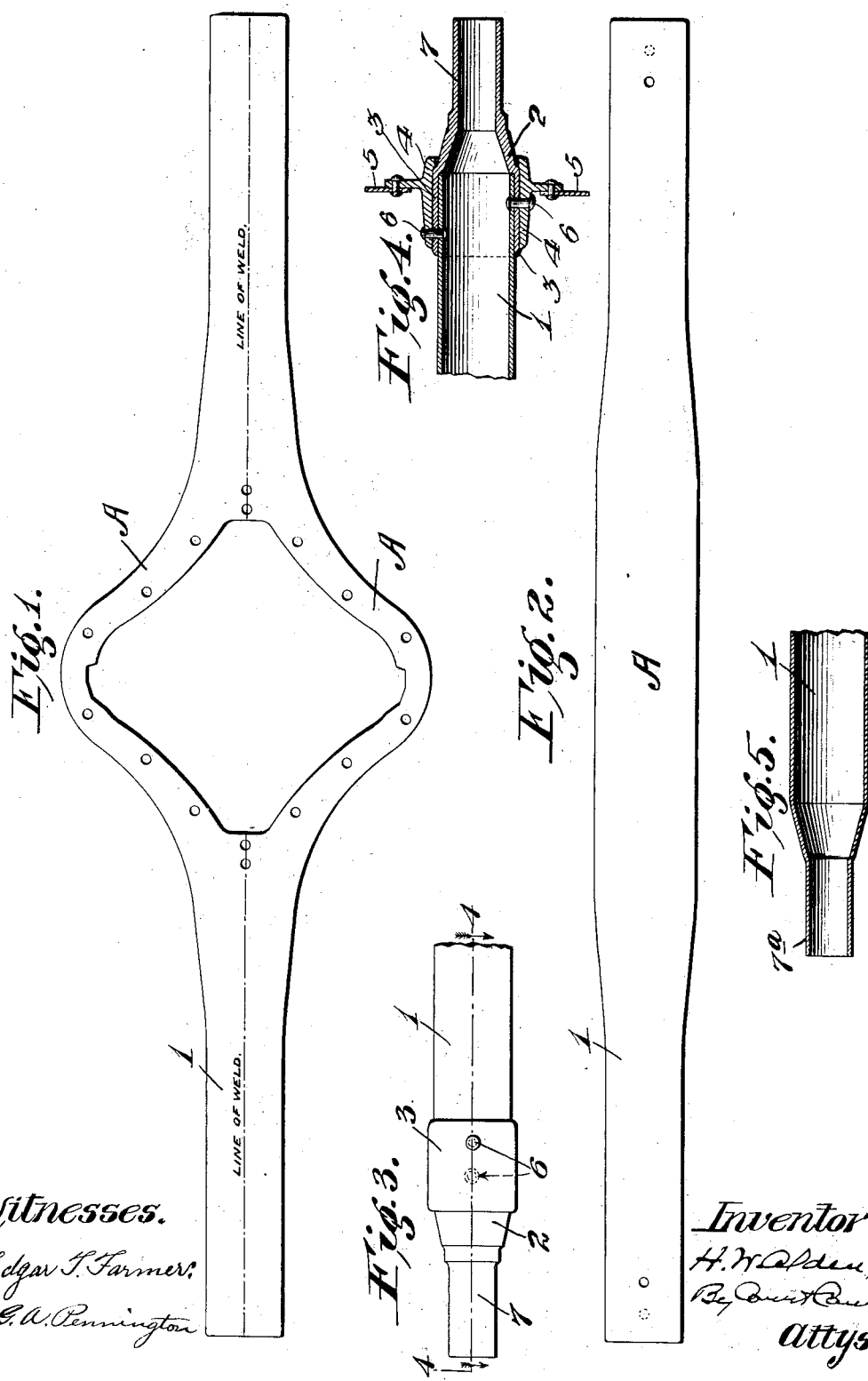

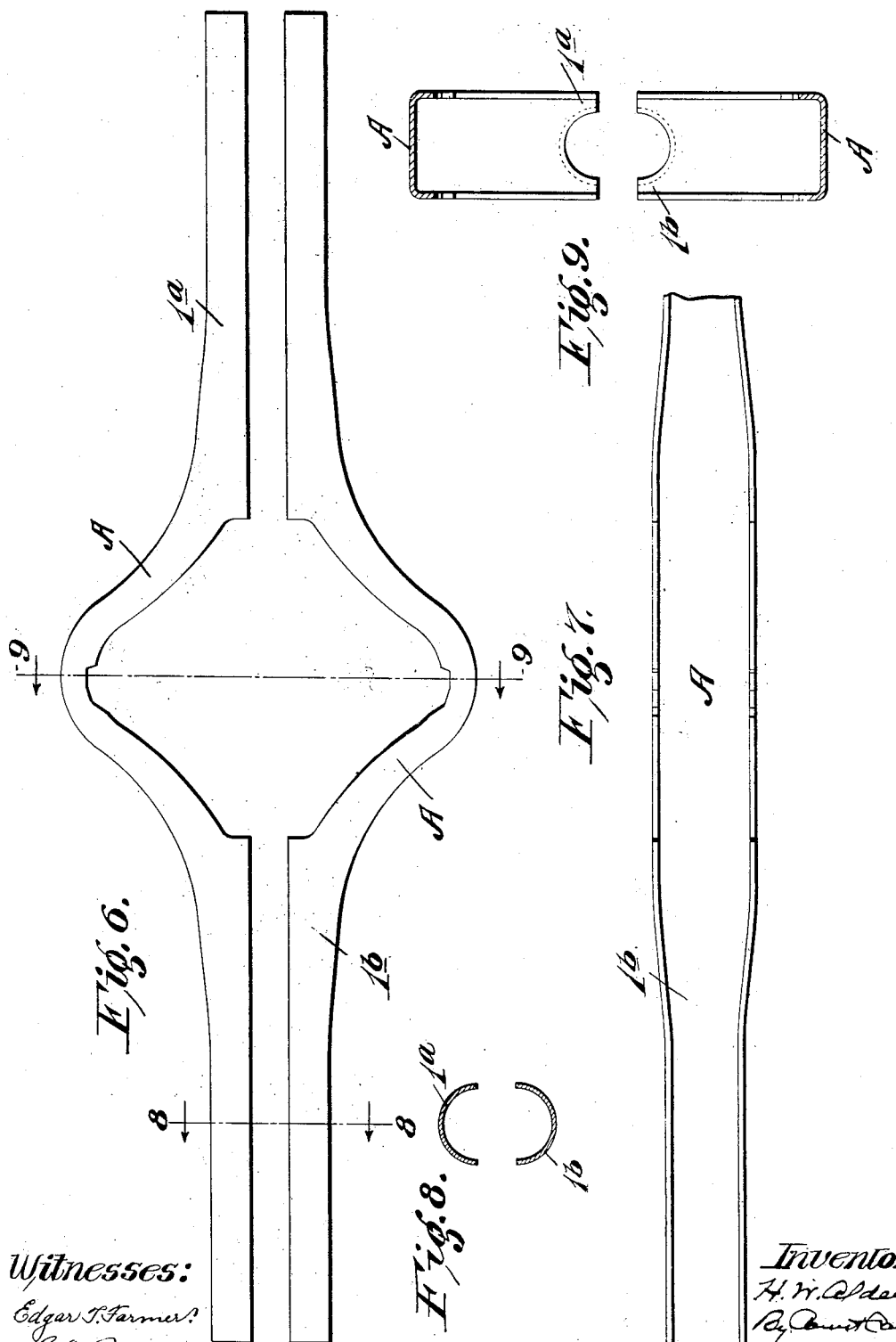

UNITED STATES PATENT OFFICE.

HERBERT W. ALDEN, OF DETROIT, MICHIGAN, ASSIGNOR TO THE TIMKEN DETROIT AXLE COMPANY, OF DETROIT, MICHIGAN, A CORPORATION OF OHIO.

AXLE.

1,108,114. Specification of Letters Patent. Patented Aug. 25, 1914.

Application filed March 31, 1910. Serial No. 552,547.

*To all whom it may concern:*

Be it known that I, HERBERT W. ALDEN, a citizen of the United States, and a resident of the city of Detroit, in the county of Wayne and State of Michigan, have invented a new and useful Improvement in Axles, of which the following is a specification.

This invention relates to tubular axles for motor vehicles and the like, and more particularly to pressed steel axles.

It has for its principal objects to minimize weight without sacrificing strength and durability, to locate the line of weld in the horizontal plane through the neutral axis of the axle where the strain is at a minimum, to minimize the number of separate operations in machining, and to attain certain other advantages hereinafter more fully appearing.

The invention consists in the parts and in the arrangements and combinations of parts hereinafter described and claimed.

In the accompanying drawings which form part of this specification and wherein like symbols refer to like parts wherever they occur, Figure 1 is a side elevation of the main or body portion of a tubular axle according to my invention; Fig. 2 is a top plan view.; Fig. 3 is a fragmentary view showing an axle having a separate spindle member on its end; Fig. 4 is a longitudinal section on the line 4—4 of Fig. 3, showing a portion of a brake spider arranged on the inner end of the spindle; Fig. 5 is a longitudinal section showing an axle whose end portion is drawn down to provide the spindle; Fig. 6 is a side elevation of the two halves of the axle casing before being joined together; Fig. 7 is a fragmentary top plan view of the bottom half of the axle; Fig. 8 is a transverse section on the line 8—8 of Fig. 6; and Fig. 9 is a transverse section on the line 9—9 of Fig. 6.

The axle tube or casing 1 comprises counterpart upper and lower half-sections 1ª, 1ᵇ, respectively, which are stamped from sheet metal. They are initially formed as shown in Figs. 6 and 7, and then welded together to constitute an integral structure as shown in Fig. 1. The middle portions of the two axle sections are arched or bowed apart as at A and are channel-shaped in cross section; and the outer portions are drawn or tapered down to substantially semi-circular form or half-tubes. The meeting edges of the outer portions of the two sections are in a substantially horizontal plane which passes through or adjacent to the neutral axis of the axle. These meeting edge portions of the axle sections are welded together, thereby constituting a tubular axle having an enlarged central portion which is open at front and back so as to receive the usual differential gearing which is provided on driving axles. The middle portion of the axle is substantially rectangular in transverse vertical section and the portions adjacent to its ends are substantially cylindrical, while the portions intermediate the middle and end portions are tapered or conical.

In the above described construction, it is noted that the lines of the welds extend from the ends of the axle only to the edges of the middle front and rear openings and in a plane where the strain is at a minimum; whereas, if the axle sections were initially divided vertically into front and back halves, the lines of the welds would be at the top and bottom of the axle where the strain is at a maximum. The present construction also permits the use of a thin sheet of metal and, further, permits the use of a narrow strip from which to make the stamping. Hence, in addition to being of light weight, there is little waste of material.

On the end of the axle tube 1, is preferably sleeved a tubular spindle extension 2. This tubular spindle extension 2 is also, preferably, a steel stamping and it is preferably sleeved externally on the end of the tube 1 so that only one surface of the tube, namely, the outside, need be machined. The reason for this construction is that the wall thickness of the spindle end of a tubular axle must be greater at the reduced diameter inside of the wheel hub than the wall thickness of the enlarged portion immediately back of the wheel need be. Furthermore, it is necessary to machine the spindle part of the axle in order to get a good seat for the wheel bearings and this reduces the wall thickness. Consequently, if the stampings were drawn down to make a spindle integral with the body of the axle, it would be necessary, in order to secure sufficient strength for the spindle, to use sheet steel for the whole axle considerably thicker than would be necessary to give the strength required elsewhere. In order, therefore, to use steel of the minimum thickness for the main part of the axle it is desirable to put on a separate spindle piece substantially as shown. The material of the spindle sleeve 2 is, therefore, in practice, considerably thicker than that of the main tube 1. In some cases, however, it may be desirable to draw the end portion of the axle to a reduced diameter to provide the spindle as shown in Fig. 5.

The enlarged inner end portion 3 of the spindle sleeve 2 is machined on its inner side to snugly fit over the machined outer surface of the end portion of the tube 1; and the outer face of this enlarged portion 3 of the spindle sleeve is preferably machined to receive the hub portion 4 of a brake spider 5. The sleeve portion 3, hub portion 4 and tube 1 are preferably secured together by rivets 6 or in any other suitable manner whereby a rigid connection may be effected.

The spindle portion proper 7 of the tubular extension 2 is drawn down to a reduced diameter and its outer surface is machined to receive the inner bearing sleeves or rings, not shown, of the antifriction bearings for the wheel hub. The outer end portion of the spindle 7 may be externally screw-threaded to receive adjusting and locking nuts for the wheel bearings.

While the two sections or halves of the axle have been herein generally described as being welded together, it is noted that the term "welded" is intended to include brazing and soldering also.

Obviously, the device admits of considerable modification without departing from my invention. Therefore, I do not wish to be limited to the specific construction and arrangement shown.

What I claim is:

1. A pressed steel tubular axle comprising duplicate channeled top and bottom half-sections whose middle portions are bowed apart in a vertical plane, and the meeting edge portions of said top and bottom half-sections being welded together along lines substantially in a horizontal plane or the neutral axis of the axle and extending from the bowed middle portion to the ends of said half-sections.

2. A pressed steel tubular axle comprising channeled top and bottom half-sections whose middle portions are substantially right angular in cross section and bowed apart in a vertical plane, and the outer portions of said half-sections on each side of the middle portions thereof being substantially semi-circular in cross section and the meeting edges thereof being welded together on lines adjacent to a horizontal plane or the neutral axis of the axle.

3. A tubular axle comprising a pressed steel main member, and a tubular spindle member having its inner end portion sleeved over the end portion of said main member and having its outer portion drawn to a reduced diameter and arranged externally to receive the bearings of the wheel hub, and a brake spider sleeved on the inner end portion of said spindle member.

Signed at Detroit, Michigan this 19th day of March, 1910.

HERBERT W. ALDEN.

Witnesses:
 GEO. L. BEADELL,
 C. C. MILLER.